United States Patent [19]

Beifus

[11] 4,358,730
[45] Nov. 9, 1982

[54] AC POWER CONTROL CIRCUIT
[75] Inventor: Brian L. Beifus, Fort Wayne, Ind.
[73] Assignee: Essex Group, Inc., Fort Wayne, Ind.
[21] Appl. No.: 275,557
[22] Filed: Jun. 19, 1981
[51] Int. Cl.³ ............................................. G05B 24/02
[52] U.S. Cl. ............................... 323/322; 318/345 D; 318/345 E
[58] Field of Search ........... 318/345 R, 345 C, 345 D, 318/345 E, 345 G, 345 H; 323/300, 319, 320, 322

[56] References Cited

U.S. PATENT DOCUMENTS

| | | |
|---|---|---|
| 3,633,095 | 1/1972 | Hood . |
| 3,691,452 | 9/1972 | Aguiar . |
| 3,749,884 | 7/1973 | Detmann et al. . |
| 3,821,516 | 6/1974 | Hayes et al. . |
| 3,946,200 | 3/1976 | Juodikis . |
| 4,053,733 | 10/1977 | Murata et al. . |
| 4,138,607 | 2/1979 | Engelmann . |
| 4,287,468 | 9/1981 | Sherman ......................... 323/319 X |
| 4,311,956 | 1/1982 | Tolmie, Jr. ........................... 323/300 |

*Primary Examiner*—William M. Shoop
*Attorney, Agent, or Firm*—Stephen A. Schneeberger

[57] ABSTRACT

An improved control circuit for accurately regulating the power from a supply of unregulated AC voltage to a load, such as a fan motor, via a signal responsive conduction-control switch. The circuit employs first and second comparators. One input to the first comparator is a DC signal representative of desired power level. The other input of the first comparator is a signal having a DC component and a ripple component. The output of the first comparator is a rectangular waveform having a duty factor which is a function of the desired power level relative to the reference load power level. The first comparator output is integrated and then supplied as an input to the second comparator. A sawtooth signal of constant DC level provides the other input to the second comparator. The sawtooth is a submultiple, or preferably a multiple of the AC supply frequency. The output of the second comparator is another rectangular waveform, the duty factor of which is a function of the DC level of the integrated signal and is used to control the conduction timing of the conduction control switch. Preferably, the combined DC-with ripple-signal input of the first comparator is provided by feedback from the second comparator output which is passed through a voltage scaling network connected to an unregulated DC supply. The time constants of the closed loop are selected to provide a temporary power overshoot when increasing the power level. Supplemental limit circuits provide limit signals directly to the second comparator input.

12 Claims, 4 Drawing Figures

AC POWER CONTROL CIRCUIT

DESCRIPTION

1. Technical Field

The invention relates generally to power controllers and more particularly to circuitry for controlling power to AC loads. The invention particularly relates to a circuit for accurately controlling the power input to a load having an unregulated AC supply voltage and for operating at a plurality of selectably different power level settings. Further still, the invention finds particular utility in controlling the speed of an AC fan motor, especially in response to the output from a digital microprocessor.

2. Background Art

Many alternating current (AC) loads are intended for use in a manner which requires accurate and stable control or regulation of the power applied to them. A particular example is the need to accurately control the speed of an AC fan motor associated with an air conditioning unit; however, it will be appreciated that other motors and even simple AC loads such as various types of lights may require accurate control of the power. That control may be accomplished to varying degrees in a variety of ways, such as by setting the conduction or firing angle of a triac switch to conduct at a fixed phase angle of the supply voltage. However, in many instances, the amplitude of the AC line supply voltage may vary enough that the degree of power control stability obtained by establishing a particular conduction timing may leave much to be desired. Additionally, variations in both the inherent values of the components of the circuit and the temperatures to which the circuit is exposed may further reduce the accuracy and/or stability of its power control.

Increasingly, the AC load (or loads) is, or are, part of a sophisticated control system employing a microprocessor or microcomputer. If the capacity of the system permits, the microprocessor may in certain instances be programmed to effect the requisite degree of control of the power to the AC load, as by monitoring the amplitude of the AC supply voltage and digitally determining that percentage of a cycle necessary for conduction to attain the desired power. However, if that capacity is not available or is impractical to implement, supplemental means must be employed to effect that control.

It is also desirable in the control of some AC motors that a relatively large starting torque be available when seeking to increase speed rapidly, as from a stopped condition.

Accordingly, it is a principal object of the present invention to provide improved control circuitry for regulating the power to an AC load. Included within this object is the provision of load power control circuitry which may readily be modified without need to reprogram associated processors.

It is a further object of the invention to provide an improved control circuit for accurately controlling the power to an AC motor under varying line voltage conditions thereby to control the motor speed under a particular constant load. Included in this object is the ability to provide such improved control accuracy and stability with a minimum of precision components. Also included within this object is the provision of enhanced torque during motor starting and/or speed increasing conditions.

In accordance with the invention, there is provided an improved control circuit for accurately regulating the power from a supply of unregulated, and thus possibly varying, AC voltage to a load via a signal responsive conduction-control switch. The circuit employs a first comparator having at one input a DC signal representative of the desired load power level and at the other input a signal having a certain DC level and a periodic ripple thereon. That certain DC level represents both a reference load power level and an automatically adjustable component proportional to the voltage of the unregulated supply.

The output of the first comparator is a square waveform having a duty factor which is a function of the desired power level relative to the reference load power level and compensating for any variations in the unregulated AC supply voltage. As used herein, the term "square waveform" means any two-state, rectangular waveform having a duty factor between 0 and 100%. This comparator output waveform is integrated to provide a signal having a DC component which is a function of the waveform duty factor. That signal comprises one input to a second comparator, the other input signal to which is provided by a periodic sawtooth of constant DC level. The repetition rate of the sawtooth is a submultiple or, in the preferred arrangement, a multiple of the frequency of the AC supply. Typically, the supply is 60 Hz and the sawtooth repetition rate is 120 Hz.

The output of the second comparator is another square waveform, the duty factor of which is determined by the DC level of the integrated signal such that the timing of the transition to and the duration in a particular one of the square waveform's two states controls the conduction timing of the switch to effect the desired load power level, including compensation for any variation in the supply voltage. The conduction control switch is of the type which terminates conduction when the AC supply current crosses zero.

In the preferred arrangement, a portion of the output of the second comparator is fed back, with the appropriate polarity to provide the ripple input to the first comparator. The feedback network includes a voltage scaling network connected to an unregulated DC supply to introduce compensation for variations in the AC supply voltage and an integrator to develop the appropriate DC level for that signal. The time constants in the closed loop are such that the circuit effects a temporary power overshoot when increasing from one power level to another.

Supplemental limiting circuits respond separately to the "OFF" and "HIGH speed" digitally coded outputs from a microprocessor by applying respective limit-condition inputs directly to the second comparator.

BEST MODE FOR CARRYING OUT THE INVENTION

Figure 1:
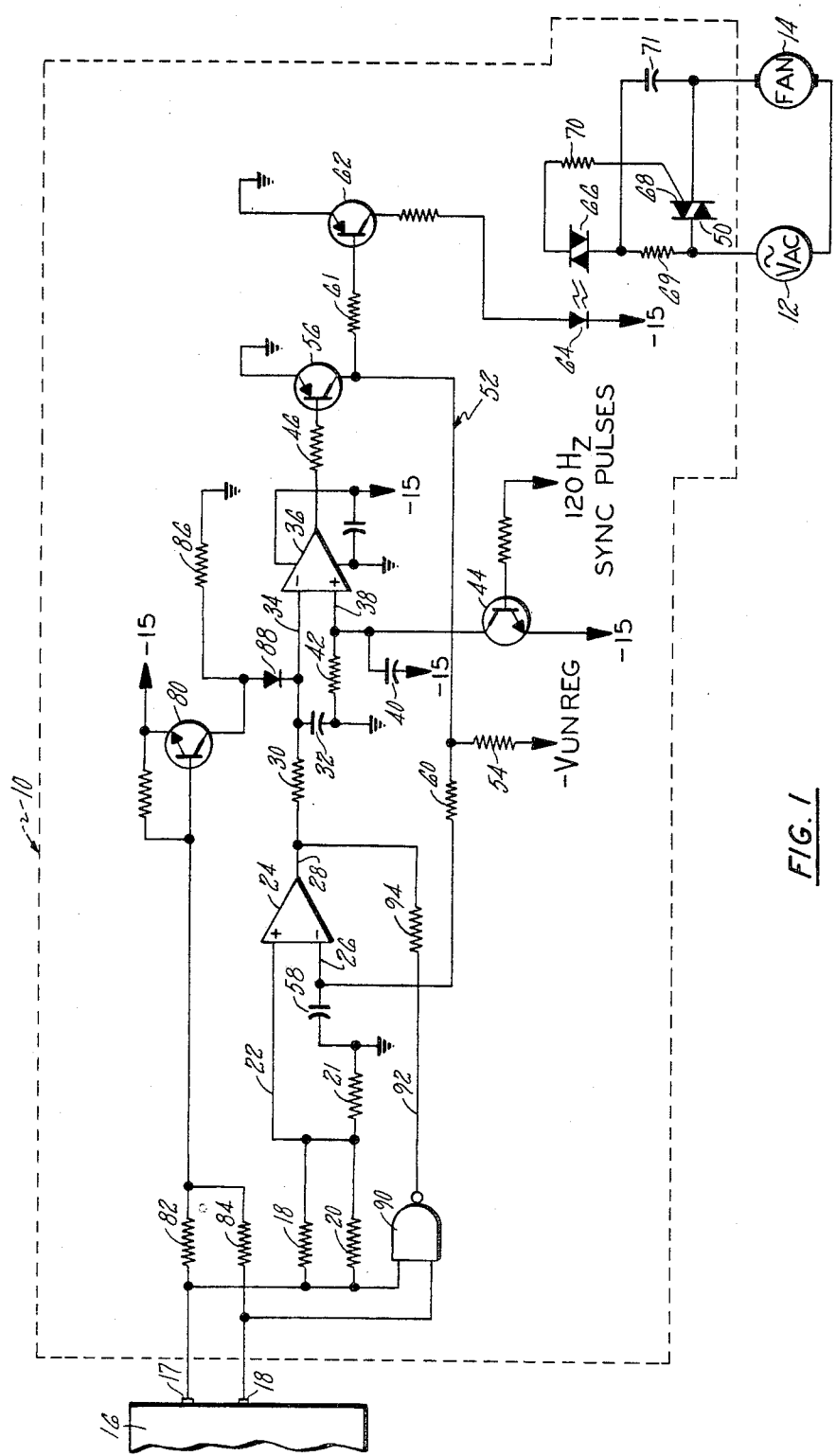
FIG. 1 is a schematical diagram of the power control circuit of the invention.

Referring now to FIG. 1 there is illustrated a control circuit 10 for accurately regulating the power delivered from a power source 12 of unregulated AC line voltage to a load, as for instance air conditioner fan motor 14. Because it is not regulated, the AC voltage of source 12 may change or fluctuate in magnitude. In the illustrated embodiment, a microprocessor 16 provides at a pair of output ports 17 and 18, a two-bit digital code representative of a desired load power level. More specifically, the digital code appearing at terminal 17 and 18 is representative of a desired speed condition for the fan motor 14, subject to the load imposed by the fan blade. In the illustrated embodiment, the microprocessor terminals 17 and 18 are capable in combination of providing four different digital codes; an "OFF" signal when both terminals are in a "low" logic state, i.e. approximately $-15$ V, a "LOW speed" signal when terminal 18 is in the high (ground) logic state and terminal 17 is in the low logic state, a "MEDIUM speed" signal when terminal 17 is in the high logic state and terminal 18 in the low logic state, and a "HIGH speed" signal when both terminals 17 and 18 are in a high logic state. The "OFF" and "HIGH speed" control are effected in a somewhat different manner than for "LOW" and "MEDIUM speed", and will be discussed later in greater detail.

Figure 2:
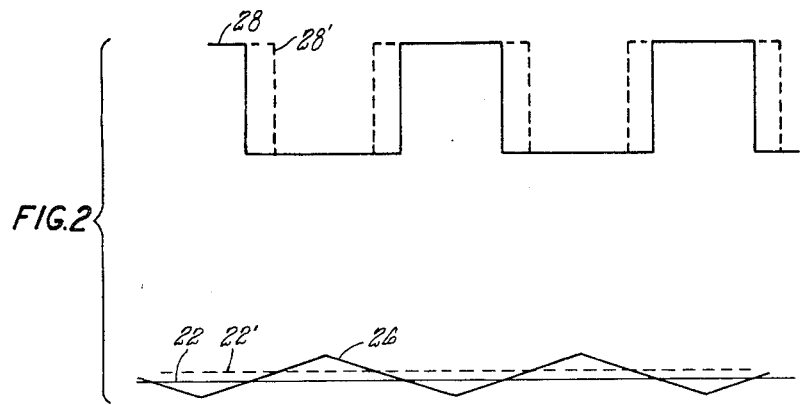
FIG. 2 illustrates the signal waveforms associated with a first comparator in the circuit of FIG. 1.

Referring for the moment to the provision of either "LOW" or "MEDIUM" speed control, digital to analog conversion of the digital signal at microprocessor output 17 and 18 is effected by the converter network of resistors 19, 20 and 21. Resistors 19 and 20 each have a terminal thereof connected to port 17 and 18 respectively, the other terminals thereof being connected in common to one end of resistor 21 having its other end connected to ground. The values of resistors 19 and 20 differ from one another by a predetermined amount such that the voltage appearing at their common junction is slightly lower or more negative for a "medium" speed than for a "low" speed. Thus, the DC voltage appearing on lead 22 connected to the positive input of comparator 24 comprises a signal representative of the desired power level (or speed) at which the fan motor 14 is to be operated. In FIG. 2, the desired power level signal 22 is shown as a solid line for "MEDIUM" speed and a dotted line with the same reference numeral primed for "LOW" speed. This same convention appears in the remaining portion of FIG. 2 and in FIG. 3. Resistors 19, 20 and 21 are preferably of relatively high precision to maintain the fidelity of this signal level. The various leads herein bearing reference numerals and the signals appearing on those leads will be referred to interchangeably by the same reference numeral.

The signal applied to the negative input of comparator 24 via lead 26 comprises a periodically varying ripple operating at or being superimposed on a certain DC level. Signal 26 is provided by feedback from at or near the output of the power control circuit 10 and will be described hereinafter in greater detail. Suffice it for the moment to consider signal 26 as being comprised of a DC signal representative of a reference load power level and representative of the precise line voltage provided by the unregulated supply 12 and further including a periodic ripple component. In the illustrated embodiment, the AC supply 12 provides a sinusoidal voltage operating at 60 Hz. The ripple on signal 26, as illustrated in FIG. 2, has a repetition rate of twice the supply frequency, or 120 Hz. Through further reference to FIG. 2, the relative voltage levels of signals 22 and 26 are illustrated as they appear to comparator 24. Accordingly, the output signal 28 from comparator 24, illustrated in FIG. 2, consists of a square waveform which assumes a "low" logic state when the ripple signal 26 exceeds the desired power level 22 and a "high" logic state when the reverse is true. Thus, the duty factor of the resulting square waveform 28 is determined as a function of the DC level of the ripple waveform 26 relative to the desired power level signal 22.

The signal 28 from comparator 24 is then integrated by an integrating network comprised of resistor 30 and capacitor 32 to provide signal 34 which is connected to the negative input of a second comparator 36. By integrating the square waveform 28, the resulting signal 34 is a periodic ripple voltage having a DC component which is a direct function of the duty factor of the square waveform 28. As used herein, the term "duty factor" refers to that portion of a full cycle of the square waveform during which the waveform is in a particular logic state, i.e. its "high" logic state. Thus, as square waveform 28 increases its duty factor by remaining in its "low" logic state for a shorter portion of a full cycle, the DC component of the signal 34 will similarly increase in a positive direction, and vice versa.

The positive input of comparator 36 receives a periodic ramp signal 38. The repetitive ramp signal 38 operates from some constant DC level and is provided by a ramp signal generator which is periodically reset. The ramp signal generator is provided by a charging circuit comprised of capacitor 40 and resistor 42 which is in turn periodically reset by the transistor switch 44. The RC time constant of resistor 42 and capacitor 40 is selected to provide the desired charging rate and the base circuit of switch transistor 44 receives brief switching pulses occurring at a 120 Hz repetition rate for resetting the capacitor. Those switching pulses applied to the base of transistor 44 may be derived in a known manner from the zero crossings of the AC supply voltage. The transistor 44 is normally nonconducting and becomes conducting to reset the capacitor only during the application of a switching pulse to its base circuit. During such time, the sawtooth signal 38 is maintained at its most negative, or base level. It will be understood that the periodic sawtooth signal 38 increases at a rate which is generally not linear but is constant in successive cycles. Moreover, that waveform is reset to its base level substantially at the instant of zero-crossing of the AC supply voltage.

Figure 3:
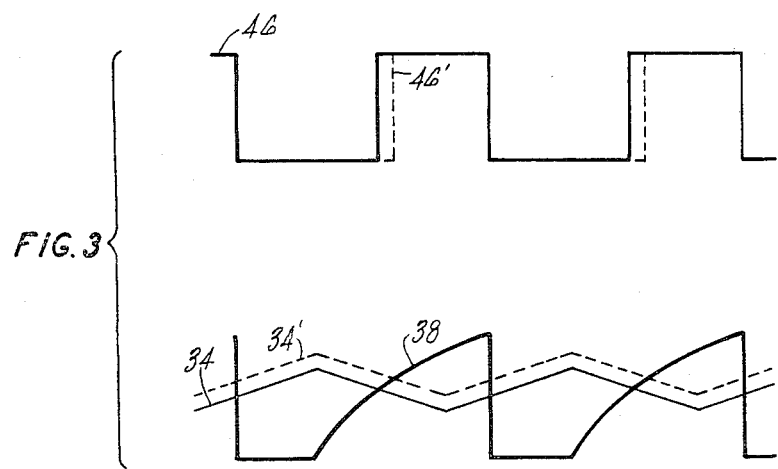
FIG. 3 illustrates the signal waveforms associated with a second comparator in the circuit of FIG. 1.

Referring to FIG. 3, signals 34 and 38 are illustrated in that relationship to one another seen by the comparator 36. Accordingly, comparator 36 provides at its output a square waveform signal 46 which assumes the "low" logic state while the sawtooth signal 38 is below the signal 34 and a "high" logic state when those conditions are reversed. Once again it will be noticed that the duty factor of the square waveform 46 is determined by the DC level of the waveform 34 which in turn was a function of the input signals 22 and 26 to the first comparator 24. As will be seen hereinafter, it is the timing, including duration, of the logic states of signal 46 which determines the portion of each half cycle of the AC line voltage during which conduction occurs to thereby effect the requisite control of power to the fan 14. For this reason, the circuitry which is intermediate comparator 36 and a conduction control switch 50 only serves to condition signal 46 as to polarity, feedback amplitude and/or strength, but does not affect its timing.

In accordance with an aspect of the invention, the requisite qualities of the signal 26 provided at the negative input of comparator 24 are most suitably provided by a feedback loop generally designated 52. The output signal 46 from comparator 36 is inverted by transistor 56 to provide the requisite polarity to the signal being fed back on loop 52. Moreover, the load resistor 54 connected in the collector circuit of inverter transistor 56 is connected at one end to a source of DC voltage, i.e. $-V_{unreg}$, which is derived from the unregulated AC line voltage supply 12 and which varies in amplitude as a function of variations or fluctuations in the line voltage. Specifically, $-V_{unreg}$ is a negative DC potential of about $-30$ volts which is obtained from an energy storage capacitor associated with the AC to DC power supply, not shown. Also connected to the collector of transistor 56 is a base resistor 61 for a subsequent transistor 62 having a grounded emitter. Thus, the amplitude of the square waveform signal appearing on feedback loop 52 from the collector of transistor 56 is dependent upon the current through resistors 54 and 61 and thereby introduces line voltage compensation as will be explained.

As $V_{unreg}$ goes more negative with line voltage, the DC component of the signal 26 will also be seen to go more negative, resulting in an increase in the duty factor of the signal 28 and a reduction in the duty factor of the signal 46, thereby tending to have a speed decreasing effect. However it will be remembered that such change occurred as a result of $-V_{unreg}$ going more negative which correspondingly was a result of an increase in the line voltage. Therefore, the increase in line voltage to the fan motor 14 is offset by the change in the signal 46 calling for somewhat reduced power, such that the fan speed is maintained substantially constant for fluctuations in the line voltage.

In addition to the signal amplitude scaling characteristic afforded by resistors 54 and 61 in the feedback loop 52, integration of the feedback signal is also provided by an integrating network consisting of capacitor 58 and resistor 60. Capacitor 58 may employ a Mylar dielectric and have a value of 0.047 microfarads. The resistor 60 is made sufficiently large, i.e. 1 megohm, that the ripple appearing in signal 26 is of relatively small amplitude. Resistors 54 and 61 may typically have values of 6.8 and 15 kohms, respectively. Thus, it will be seen that the variables which affect the DC level of feedback signal 26 are the scaled amplitude of the square waveform signal from inverter 56, as determined by the line voltage compensating resistors 54 and 61 and the duty factor of that waveform.

Referring briefly to the final control of the fan motor 14, the conduction timing signal 46 is inverted by inverter 56 and is extended via base resistor 61 to a drive circuit which consists of transistor 62, a light emitting diode 64, and opto-triac 66, a triac 68 and resistors 69 and 70. Transistor 62 reinverts signal 46 and serves as a driver for the light emitting diode 64. When signal 46 assumes the high or logic "1" state, the diode 64 is turned on to correspondingly turn on the opto-triac 66 via optical coupling. When triac 66 is turned on, current flows momentarily from the line, $V_{AC}$, through resistor 69, the triac 66, resistor 70, the gate-MT1 junction of triac 50 and the fan motor 14 to the common conductor between the motor and the line, thereby completing the circuit. This pulse of current turns "on" triac 50, bypassing triac 66 and resistors 69 and 70. Triac 50 remains "on" or conducting for the remainder of that half cycle of the line supply and completes the path for the fan motor 14. As the line current passes through zero, the triac 50 ceases conduction, thereby opening the current path until pulsed "on" again by a subsequent drive pulse. Resistor 69 and a capacitor 71 form a snubber circuit which suppresses transient voltages across opto-triac 66 and triac 50.

As was previously alluded to and is set forth by the solid line and dotted line waveforms of FIGS. 2 and 3, a "MEDIUM" speed setting supplies a relatively more negative desired load power signal 22 than 22' for a "LOW" speed setting, which in turn results in a shorter duty factor for waveform 28 relative to 28', which in turn following integration results in a more negative signal 34 relative to 34' and thus a greater duty factor for waveform 46 relative to waveform 46'. The greater duty factor for "MEDIUM" speed waveform 46 relative to "LOW" speed waveform 46' reflects an earlier transition of that signal from a "low" logic state to a "high" logic state and thus a relatively longer duration in that "high" logic state since both return to the "low" state at the same instant of the zero-crossing by the line current. Thus, with reference to FIG. 4, it is seen that the conduction control triac 50 is turned on earlier in each half cycle of the line supply at "MEDIUM" speed than for "LOW" speed.

When a step transition is made in signal 22 from "MEDIUM" speed to "LOW" speed, or vice versa, the DC level of feedback signal 26 appearing at the other input of comparator 24 will tend to track that change. However, because of the accumulated time constants of the integrators in the closed loop, that tracking is delayed on the order of at least several line cycles and typically as much as 30 cycles of the line supply. Due to the gain of the signal fed back, the DC component of that signal 26 when it attains its steady state level is changed but is appropriate for the requisite comparison with the new level of signal 22. This closed-loop arrangement provides considerable stability to the circuit. Moreover, during the delayed (i.e. 10–30 line cycles) transition of signal 26 when input 22 is changed, the output signal 46 from comparator 36 will be temporarily exaggerated in its timing in the direction of the change. For instance, in going from a lower speed or power to a greater one, the duty factor of signal 46 is temporarily increased to a greater extent than it will be when signal 26 attains its steady state. During this interval, the fan motor 14 (or any other load) will see a power surge or "burst". This overshoot or burst of power is particularly advantageous in speed increases particularly from a "Power OFF" condition, to apply a high starting torque to overcome the rest inertia and static friction of the motor.

Returning to FIG. 1, consideration will be given to the supplemental circuits which cooperate with the aforedescribed circuitry to provide control at the "Power OFF" and "HIGH" speed conditions. These two conditions represent predetermined power limits to the system. The need for additional circuitry arises from the microprocessor's digital coding of the "Power OFF" and the "HIGH" speed modes, from the polarities required by the aforedescribed closed-loop circuitry, and because the three-resistor D to A converter of resistors 19, 20 and 21 is incapable of providing the necessary voltage range.

Figure 4:
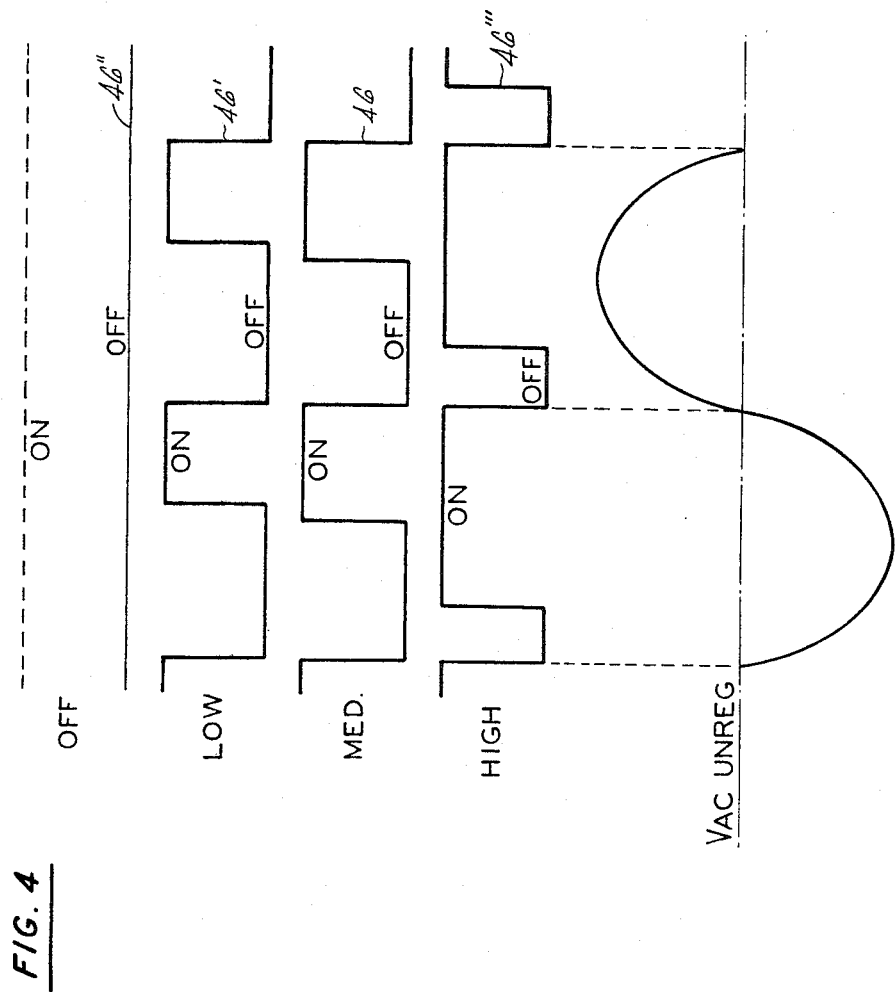
FIG. 4 illustrates the supply voltage waveform and the associated switch-control waveforms for different load requirements.

Considering first the "Power OFF" mode when both microprocessor outputs 17 and 18 are low, there is insufficient current into the base of a transistor 80 through the parallel resistors 82 and 84 of equal value to keep the transistor on. The emitter of transistor 80 is connected to the potential of the "low" logic state and the collector is connected to the "high" (ground) logic state via a load resistor 86. When transistor 80 is off or nonconducting, its collector is at or near ground and a diode 88 connected to that collector and to the input lead 34 to comparator 36 is poled to ground that comparator input. As such ground potential represents the "highest" possible level which can be applied to that negative input of comparator 36, and it exceeds the peaks of sawtooth 38, the duty factor of signal 46" from the comparator and illustrated as the "OFF" signal in FIG. 4 is nil. Thus the triac 50 is never fired into conduction.

In the "HIGH" speed control mode both microprocesssor outputs 17 and 18 are in the "high" logic state, which signals are extended to two respective inputs of a NAND gate 90. The output signal 92 of NAND gate 90 goes to a "low" logic state when both inputs to the gate are high. Signal 92 is extended through resistor 94 to the output of comparator 24 to pull that output, i.e. signal 28, to a relatively low level of approximately −14 V. This has the effect of causing the DC level of signal 34 to comparator 36 to be relatively quite negative, which in turn greatly increases the duty factor of the comparator's output signal 46''', as seen in FIG. 4. Typically, the duty factor of signal 46''' is between 80% and 100%, depending in part on the precise shape of sawtooth waveform 38. This initiates conduction of and by triac 50 quite early in each half cycle of the supply voltage such that full power, or near full power, is delivered to the fan motor 14 for a maximum or "HIGH" speed setting.

FIG. 4 depicts the signals 46", 46', 46 and 46''' which determine the conduction intervals of triac 50 for the "OFF", "LOW", "MEDIUM" and "HIGH" speed settings respectively, relative to the timing of the AC supply voltage. It will be appreciated that the duty factors of the control signals associated with the "LOW", "MEDIUM" and "HIGH" speed modes may each be of any predetermined value which retains their relative function in the speed range.

Although this invention has been shown and described with respect to detailed embodiments thereof, it will be understood by those skilled in the art that various changes in form and detail thereof may be made without departing from the spirit and scope of the claimed invention.

Having thus described a typical embodiment of my invention, that which I claim as new and desire to secure by Letters Patent of the United States is:

1. A control circuit for accurately regulating the power to a load which is selectively connected to a power supply of unregulated AC line voltage by a signal responsive conduction-control switch, said control circuit comprising:

means for supplying a first DC signal representative of at least one desired load power level;

means for supplying a second signal comprising a DC level with a periodic ripple, said DC level representing a reference load power level and an automatically adjustable component proportional to the voltage level of said unregulated AC line voltage;

first comparing means having inputs of and being responsive to said first and said second signals for providing a third signal having a square waveform the duty factor of which is a function of said desired power level relative to said reference load power level and compensating for said unregulated AC line voltage level;

means responsive to said third signal for providing a fourth signal having a DC component which is a function of said third signal duty factor;

means for supplying a fifth signal comprising a periodic sawtooth of constant DC level having a repetition rate which is a multiple of submultiple of the frequency of said AC supply;

second comparing means having inputs of and being responsive to said fourth and said fifth signals for providing a sixth signal, said sixth signal being a square waveform varying between two states at the repetition rate of said fifth signal and the duty factor of which is determined by the DC component of said fourth signal such that the timing of transition to and the duration in a particular one of said states thereof is a function of said desired power level relative to said reference load power level and compensated for said unregulated AC line voltage level; and means for operatively extending said sixth signal to said conduction switch in a manner to control the conduction timing of said switch at least as a function of the timing of transition to and the duration of said particular one state of said sixth signal.

2. The control circuit of claim 1 wherein said means for supplying said second signal comprises feedback means operatively connected to feedback of a portion of said sixth signal, said feedback means including scaling means operatively connected to the supply of unregulated voltage and integrating means, thereby to establish said DC level and said periodic ripple of said second signal.

3. The control circuit of claim 2 wherein said scaling means includes a resistive divider, one end of said divider being connected to an unregulated DC voltage derived from said unregulated AC line voltage supply.

4. The control circuit of claim 2 wherein said means for providing said fourth signal comprises means for integrating said third signal.

5. The control circuit of claim 2 wherein said means for generating said fifth signal sawtooth comprises means for generating a ramp signal and means for resetting said ramp signal generator at said repetition rate.

6. The control circuit of claim 5 wherein said repetition rate is twice the frequency of said AC supply voltage.

7. The control circuit of claim 6 wherein the frequency of said AC supply voltage is 60 Hz and said ramp signal generator is reset at each zero-crossing of said AC supply voltage.

8. The control circuit of claim 2 wherein said conduction control switch responds to the transition of said sixth signal to said particular one state by initiation conduction of current from the AC voltage supply to said load and responds to the zero-crossing of said AC supply current to terminate said conduction.

9. The control circuit of claim 8 wherein said load is an AC motor, the frequency of said AC supply voltage is 60 Hz and the repetition rate of both said fifth signal and said transition to said particular one state of said sixth signal is 120 Hz.

10. The control circuit of claim 3 wherein the level of said first DC signal is selectively changeable to change the desired load power level, a change in the level of said first signal successively effects a change in the duty factors of said third and said sixth signals which change in the duty factor of said sixth signal subsequently appears as a change in said DC reference load power level portion of said second signal, said change in said second signal being less than said change in the level of said first signal and wherein the cumulative time constants in said control circuit including said third signal integrating means and said feedback means is sufficiently long that an interval of at least several cycles of said AC supply voltage is required to complete said change in said second signal, during which interval said load receives and overshoot in power for a first signal change to an increased desired load power level.

11. The control circuit of claim 2 further including supplemental limiting circuit means responsive to a digital code representative of a desired zero load power level and operatively connected to said control circuit between said first and said second comparing means for operatively modifying the DC component of said fourth signal such that said sixth signal is correspondingly modified to exclude said transition to and any duration in said particular one state thereby to prevent conduction by said switch.

12. The control circuit of claim 11 wherein said supplemental limit circuit means is additionally responsive to a digital code representative of a desired maximum load power level for operatively modifying the DC component of said fourth signal such that said sixth signal is correspondingly modified to increase its duration in said particular state to a maximum.

* * * * *